United States Patent Office 3,120,526
Patented Feb. 4, 1964

3,120,526
PREPARATION OF TRIETHYLENEDIAMINE
Walter H. Brader, Jr., Austin, Tex., assignor to Jefferson Chemical Company, Inc., Houston, Tex., a corporation of Delaware
No Drawing. Filed Jan. 22, 1962, Ser. No. 167,960
5 Claims. (Cl. 260—268)

This invention relates to a method for the production of a polycyclic compound.

More particularly, this invention relates to the production of a polycyclic diamine, namely, diazabicyclo-(2.2.2)-octane. This compound is commonly known as triethylenediamine and is prepared only with great difficulty.

This application is a continuation-in-part of copending application Serial No. 110,892, filed May 18, 1961, now abandoned, and entitled "Preparation of Polycyclic Compound."

Because of the difficulty of preparing diazabicyclo-(2.2.2)-octane, many of its possible commercial uses have not been fully investigated. Its use as a catalyst for the preparation of superior polyurethane foams is one important application. Certain quaternary ammonium salts have shown mild depressant activity in mice and some activity against microorganisms (J. Org. Chem., 24, 1348, 1959). Some quaternary ammonium salts also have ionic activity useful as detergents.

The preparation of symmetrical cyclic diamines such as piperazine, triethylenediamine, etc., presents many problems, particularly with feed stocks wherein the amino groups or their precursors are separated by ethylenic groups. Thus, with feed stocks of this nature it is normally necessary to utilize a strong catalyst and severe conversion conditions to effect the desired cyclization. However, catalytic materials useful for this purpose also catalyze a number of side reactions, including cracking type reactions leading to lower molecular weight products and condensation type reactions leading to higher molecular weight residues. Moreover, the cracking reactions and condensation reactions normally tend to occur in preference to the cyclization reaction, whereby such methods are characterized by low yields of the desired cyclic compound and high yields of undesired by-products formed by cracking or condensation, or both.

This is particularly true in the case of triethylenediamine. For example, an attempt to prepare triethylenediamine by the cyclization of N-2-halo-alkylpiperazine hydrogen halides resulted in yields of triethylenediamine of about 2% or less. Ishiguro et al. (J. Phar. Soc., 75, 1370, 1955) obtained equivalent yields when passing 2-hydroxyalkylpiperazine over silica-alumina at 325° C. Unfavorable results of this nature have resulted in a teaching that piperazine or derivatives thereof are not good starting materials for the preparation of triethylenediamine.

As a consequence, skilled workers in the art have developed techniques based on highly acidic silica-alumina catalysts. Such methods are disclosed, for example, in Herrick United States Patent No. 2,937,176 and Krause United States Patent No. 2,985,658.

In contrast to the foregoing methods, it has now been surprisingly discovered that enhanced yields of triethylenediamine can be obtained through the conversion of N-aminoethylpiperazine in the presence of a base-modified silica-alumina catalyst. The results are particularly surprising in view of the fact that those skilled in the art have heretofore considered it necessary to use strongly acidic catalysts for the process.

The process of the present invention may be described as a method wherein a feed stock comprising N-aminoethylpiperazine is brought into contact with a base-modified silica-alumina catalyst to provide a reaction mixture containing triethylenediamine and wherein the said triethylenediamine is recovered from the products of the said reaction. The process is preferably conducted in the additional presence of 1 to 10 mols of ammonia per mol of feed stock.

Any conventional silica-alumina cracking catalyst may be employed. A preferred catalyst is one comprising, for example, from about 60 to about 95 wt. percent of silica, and correspondingly, from about 40 to about 5 wt. percent of alumina, such catalyst also containing a minor amount of a base such as an alkali metal or alkaline earth metal hydroxide which is more basic than N-aminoethylpiperazine. Preferably from about 0.1 to about 100 milliequivalents of base per gram of silica-alumina are employed. The base may be added to the silica-alumina in any desired manner. For example, silica-alumina may be stirred in an aqueous solution of the base for a period of time sufficient to neutralize the aqueous solution. After this, the catalyst is recovered and calcined (e.g., at a temperature of 300° to 950° C.).

The reaction may be conducted under liquid phase or vapor phase conditions. Thus, for example, pressures from as low as 0.1 p.s.i.a. up to 5,000 p.s.i.g. may be employed. Although pressures above 5,000 p.s.i.g. are feasible, there is no particular advantage in operating in excess of 5,000 p.s.i.g.

Similarly, the temperature may be varied within comparatively wide limits. Thus, temperatures within the range of about 200° to about 500° C. have been found satisfactory; the preferred temperature range being within the range of about 270° to about 340° C. for liquid phase conditions, and 340° to 440° C. for vapor phase conditions.

Contact time may also be varied within comparatively wide limits within the range of about 0.1 to 20 pounds of feed per hour per pound of catalyst. For example, from about 0.1 to about 4 pounds of feed stock per pound of catalyst per hour may be employed with good results for a vapor phase reaction. In general, however, it is desirable to utilize a feed rate from about 2 to about 3 pounds of feed stock per pound of catalyst per hour when the reaction is conducted in the vapor phase. Thus, undesirable side reactions tend to be maximized at space velocities below about 2 pounds of feed stock per pound of catalyst per hour, while lower than desirable conversion rates are obtained above a rate of about 3 pounds of feed per hour per pound of catalyst. When the reaction is to be conducted in the liquid phase, the feed rate is preferably in the range from about 2 to 20 pounds of feed stock per hour per pound of catalyst.

A still further discovery that has been made is that low pressures within the range of about 0.05 to about 1 atmosphere provide for enhanced yields of diethylenetriamine when a vapor phase process is employed. Thus, within this pressure range triethylenediamine yields are higher and by-product yields are lower than at higher pressures.

It has been still further discovered that good yields of triethylenediamine are obtainable under liquid phase reaction conditions provided that the N-aminoethylpiperazine is brought into contact with a silica-alumina catalyst in solution in a solvent such as a $C_4$ to $C_{12}$ saturated aliphatic or aromatic monocyclic hydrocarbon or water. Preferred solvents are selected from the group consisting of water, benzene, toluene, xylenes and trimethylbenzenes. In this situation, the feed stock should comprise from about 10 to 80 wt. percent of N-aminoethylpiperazine, the remainder being solvent.

The triethylenediamine can be recovered from the products of the reaction by any suitable technique, such as the method disclosed in Herrick United States Patent No. 2,937,176.

The invention will be further illustrated by the following specific example which is given by way of illustration and not as a limitation on the scope of this invention. Where parts are given they are parts by weight.

*Example 1*

Into a one-liter beaker was added 40 ml. of 0.5 N NaOH, 200 ml. of deionized water, and 3 drops of phenolphthalein. The contents were stirred well and 100 grams of an 86% silica-12% alumina catalyst added. The mixture was stirred occasionally until the phenolphthalein color had been discharged. The catalyst was drained and calcined for two hours at 500° C.

The catalyst was tested in a continuous reactor of 200 ml. volume by continuously pumping N-aminoethylpiperazine and adding ammonia through a calibrated rotometer to the reactor zone; the reactor zone consisted of 50 ml. of catalyst. The reactor effluent was trapped, distilled and analyzed by vapor phase chromatography. The results using the modified silica-alumina and by using the untreated 86% silica-12% alumina are shown in the table below. The reaction conditions are identical; 378° C., 1 atmosphere, an AEP LHSV of 1.2 and an ammonia LHSV of 1.1.

| Catalyst | Conversion percent | Piperazine, mol percent | Triethylenediamine, mol percent |
| --- | --- | --- | --- |
| $SiO_2$—$Al_2O_3$ | 100 | 17 | 23 |
| NaOH—$SiO_2$—$Al_2O_3$ | 94 | 23 | 30 |

The results show that the yields of piperazine and triethylenediamine were increased 6 and 7 mol percent, respectively, when the base treated catalyst was used.

What is claimed is:

1. A method for the preparation of triethylenediamine which comprises contacting N-aminoethylpiperazine with a base-treated silica-alumina catalyst at a temperature within the range of about 200° to about 500° C. to form a reaction product and recovering triethylenediamine from said reaction product, said base being more basic than N-aminoethylpiperazine.

2. A method for preparing triethylenediamine which comprises contacting N-aminoethylpiperazine with a catalyst consisting essentially of from about 60 to about 95 wt. percent silica, from about 40 to about 5 wt. percent of alumina and from about 0.1 to about 100 milliequivalents of a base per gram of silica-alumina at a pressure within the range of about 0.1 p.s.i.a. to 5,000 p.s.i.g. and a temperature within the range of about 200° to about 500° C. at the rate of about 0.1 to about 20 pounds of N-aminoethylpiperazine per pound of catalyst per hour to thereby provide a reaction product and recovering triethylenediamine from said reaction product, said base being selected from the group consisting of alkali metal and alkaline earth metal hydroxides and being more basic than N-aminoethylpiperazine.

3. A method as in claim 2 wherein the temperature is within the range of about 270° to about 330° C. and wherein from about 3 to about 15 pounds of N-aminoethylpiperazine per hour per pound of catalyst is brought into contact with the said catalyst in the liquid phase.

4. A method as claim 2 wherein the pressure is within the range of about 0.05 to about 1.0 atmosphere and the space velocity is within the range of about 0.1 to about 4 pounds of feed stock per hour per pound of catalyst.

5. A method as in claim 2 wherein the N-aminoethylpiperazine is brought into contact with the catalyst in the presence of from about 1 to 10 mols of ammonia per mol of N-aminoethylpiperazine.

References Cited in the file of this patent

UNITED STATES PATENTS

| | | |
| --- | --- | --- |
| 2,981,676 | Adams et al. | Apr. 25, 1961 |
| 2,985,658 | Krause | May 23, 1961 |